United States Patent
Miller et al.

(10) Patent No.: US 9,671,199 B1
(45) Date of Patent: Jun. 6, 2017

(54) ARMOR STEEL PRODUCTS AND METHOD FOR MAKING SAME

(71) Applicant: Premier Body Armor, LLC, Kings Mountain, NC (US)

(72) Inventors: Jon Miller, Sanford, NC (US); Frank A. Stewart, Kings Mountain, NC (US); Doug Moore, Gaffney, SC (US)

(73) Assignee: Premier Body Armor, LLC, Kings Mountain, NC (US)

( * ) Notice: Subject to any disclaimer, the term of this patent is extended or adjusted under 35 U.S.C. 154(b) by 328 days.

(21) Appl. No.: 14/270,980

(22) Filed: May 6, 2014

(51) Int. Cl.
| | |
|---|---|
| *F41H 5/02* | (2006.01) |
| *C21D 1/84* | (2006.01) |
| *C21D 6/00* | (2006.01) |
| *C21D 9/42* | (2006.01) |
| *B23K 26/38* | (2014.01) |
| *B21D 5/02* | (2006.01) |

(52) U.S. Cl.
CPC ............... *F41H 5/023* (2013.01); *B21D 5/02* (2013.01); *B23K 26/38* (2013.01); *C21D 1/84* (2013.01); *C21D 6/00* (2013.01); *C21D 9/42* (2013.01)

(58) Field of Classification Search
CPC .. F41H 5/02; F41H 5/023; C21D 1/84; C21D 6/00; C21D 9/42
USPC .................................................. 148/648–654
See application file for complete search history.

(56) References Cited

U.S. PATENT DOCUMENTS

| | | | | |
|---|---|---|---|---|
| 2007/0111023 | A1* | 5/2007 | Bailey | B22F 7/04 428/683 |
| 2007/0130772 | A1* | 6/2007 | Sobe | C21D 9/42 29/897.2 |
| 2012/0144990 | A1* | 6/2012 | Baxter | F41H 5/0492 89/36.02 |

OTHER PUBLICATIONS

Armox Advance Data Sheet; www.armoxplate.com Oct. 25, 2011.
(Continued)

*Primary Examiner* — Brian Walck
(74) *Attorney, Agent, or Firm* — Nexsen Pruet, PLLC; Michael A. Mann (57) ABSTRACT

A process for making steel armor products for use, for example as body armor. The steel armor product made has a compound curve and is made from a flat blank of armor steel by high-temperature annealing an armor steel blank to slightly above its austenitizing temperature, then followed by a slow, temperature-controlled cooling it, over-pressing the annealed blank to a first configuration so it springs back to a second configuration approximating the desired product shape when released from the press, and then heat-treating the product back to its austenitizing temperature, quenching it, and tempering it at a low temperature. The tool is conveniently made by lamination, using a series of thin plates of tool steel each cut to produce an approximation of the desired die.

23 Claims, 5 Drawing Sheets

(56) References Cited

OTHER PUBLICATIONS

Ballistic Testign of SSAB Ultra-High-Hardness Steel for Armor Applications; by Dwight D. Showalter, William A. Gooch, Matthew S. Burkins, and R. Stockman Koch; Army Research Laboratory; title page through p. 44, diagram, and drawing Oct. 30, 2008.
Detail Specification; Armor Plate, Steel, Wrought, Ultra-High-Hardness; US Army Research Laboratory; pp. 1-24 Jul. 24, 2009.
Detail Specification; Armor Plate, Steel, Wrought, High-Hardness; US Army REsearch Laboraty; p. 1-29 Oct. 24, 2008.
Detail Specification; Armor Plate, Steel, Wrought, Homogeneous (for Use in combat-vehicls and for Ammunition Testing); US Army Research Laboratory; pp. 1-46 Jul. 24, 2009.
Detail Specification; Armor Plate, Steel, Wrought, High-Hardness; US Army Research Laboratory; pp. 1-30 Oct. 24, 2008.

* cited by examiner

ARMOR STEEL PRODUCTS AND METHOD FOR MAKING SAME

BACKGROUND

The use of armor steels to provide protection against small arms is common practice within the armor industry. Armor steels are readily available, with the most widely-used materials being known as "MIL-Spec" armor steels. The most common specifications for these are: MIL-DTL-12560, Armor Plate, Steel, Wrought, Homogeneous (common name RHA); MIL-DTL-46100, Armor Plate, Steel, Wrought, High Hardness (common name High-Hard); and MIL-DTL-32332, Armor Plate, Steel, Wrought, Ultra-High-Hardness Rather than defining the specific alloys for the steels, these specifications cite the maximum content of the primary alloying elements, along with the acceptable production tolerances for the percentages of the elements. The specifications also cite steel hardness and minimum ballistic-protection performance requirements, as well as a plethora of more mundane requirements such as steel sheet flatness, waviness, etc. The ballistic performance requirements of these specifications are rarely indicative of the desired performance against the ballistic threats for particular applications.

Many steel mills recognize a market for armor steels that provide ballistic protection exceeding the performance requirements of the MIL-Specs. In fact, the above-cited specifications are re-written as more exotic steels evolve. Examples of armor steels of high ballistic performance are those manufactured by Industeel, a subsidiary of Arcelor-Mittal Group, and sold under the trademark MARS (series 190, 240, 270, and 300), by SSAB Technology AB and sold under the trademark ARMOX (series 370T, 440T, 500T, 600T, and ADVANCE), and by Allegheny Technologies Incorporated and sold under the trademarks 500-MIL and 600-MIL.

Armor steels are produced in large 2.5 m×5 m (8'×16') flat plates, heat-treated to the hardness required for the requisite ballistic performance. Armor steel plates thus produced are certified as having ballistic properties. Cutting and forming these armor steel plates into products for sale is not a trivial matter. Armor steels are extremely brittle and highly susceptible to cracking. Manufacturers of ordinary hard steel plates—plates not as hard as armor steel plates—recommend using large bend radii when forming the material, and polishing the cut edges before bending to remove any discontinuities that could become stress-concentration points.

A particularly important product made of armor steel is body armor. Body armor is typically in the form of small plates that are loaded into the pockets of vests worn by military and law enforcement personnel for protection against small arms fire.

Most body armor is either made of steel or of a ceramic and composite matrix. Steel body armor is effective against bullets fired from hand guns but, if made of armor steel, effective in stopping high powered rifle bullets, it becomes especially heavy. In addition to its weight, it is also less than comfortable because it cannot be easily formed to the contours of the body of the wearer, but is bent through small angles about a vertical axis. Ceramic and composite material, on the other hand, may be effective against both hand guns and high powered rifles and is lighter and more easily molded to have a form-fitting compound curve so it is more comfortable to wear. However, it is at least an order of magnitude more expensive than armor steel. The higher price for the better, lighter, and more effective protection unfortunately puts composite armor out of reach for all but a few of those who would benefit by having it.

SUMMARY OF THE INVENTION

The present invention is a process for making armor steel products for use as body armor and other products. Armor steel products are products made of armor steel for a specific application. In particular, the present invention is a method for making products of armor steel that have curves, including compound curves. A product with a compound curve has a shape defined by more than one radius in which a second radius has a different axis than its first radius. The product with the compound curve is made by annealing an armor steel blank at a temperature above its austenitizing temperature to soften it, and then cooling it very slowly, thus causing it to lose its anti-ballistic level of hardness. The softened blank is then over-pressed so that, when released from the press, when it springs back part way from the over-pressed configuration, it is in the desired product configuration. The product is heat-treated to its austenitizing temperature again and then quenched in oil, then tempering it at a temperature not exceeding 150 degrees C., to the desired hardness. The present method can produce armor steel products with compound curves for body armor much less expensively than ceramic composite body armor.

Surprisingly, after high temperature annealing and mold pressing an armor steel blank to form compound curve, the shaped product can be heat-treated and tempered to a hardness that exceeds the hardness of the original steel blank. Examination of the microstructure of the raw steel blanks and that of the re-hardened product reveals much clearer grain boundaries than the parent material, for example.

In addition, the mold used for over-pressing the blank may be made by laminating a series of thin plates of tool steel, each cut to represent a thin section of the complete mold.

Those skilled in the art of the use of steels for armoring people and equipment will appreciate many features and advantages of the present process from a careful reading of the Detailed Description of Embodiments of the Invention accompanied by the following drawings.

DETAILED DESCRIPTION OF EMBODIMENTS OF THE INVENTION

The present process forms armor steel into a product, such as body armor, but other products made of armor steel particularly those that are curved and particularly those that have a compound curve may advantageously be made according to the present method. A compound curve means that at least a portion of the product is defined by curves in each of two, non-parallel directions. In body armor, for example, a torso plate is curved in two orthogonal directions.

The process requires a plate of armor steel. Armor steel is ballistic steel that meets or exceeds certain specifications and is available from many sources. Common armor steel meets any one of MIL-DTL-12560J (MR) in effect 24 Jul. 2009, MIL-DTL-46100E (MR) with Amendment 1, in effect 24 Oct. 2008, or MIL-DTL-32332 (MR) in effect 24 Jul. 2009. These specifications are hereby incorporated herein in their entirety by reference.

Steel manufactured by SSAB Technology AB, which is commercially available from the manufacturer and sold under the mark ARMOX ADVANCE is suitable for body armor torso plates. Due to the relatively high cost of this material, it has been used primarily in weight-sensitive light vehicle armoring applications, where the use of less expensive and less protective steel would necessitate thicker and heavier plating to provide equivalent ballistic properties. Because of its effectiveness against small arms, it can be thinner and lighter than body armor made of less effective armor steel. However, until the present invention, armor steels such as this one, because of its ultra-high-hardness, have not been formed into compound shapes such as body armor torso plates. In fact, bending and forming and even laser cutting this steel jeopardizes its ballistic properties and essentially voids the manufacturer's warranty.

The extreme hardness of this steel, typically RC 58-63 on the Rockwell C Scale and roughly 660 on the Brinell HBW scale, indicates that forming compound curves is not practical using the material in its as-received, hardened condition because of its high susceptibility to cracking and the almost explosive severity of the "spring-back" of the pressed metal on release from the press. However, in the present method, it has been discovered that the high degree of hardness of armor steel can be sacrificed temporarily by high-temperature annealing followed by slow cooling and then completely restored after pressing by heat-treating and low temperature tempering the formed product in accordance with the present method.

Briefly, the process of forming compound curves required for body armor made of armor steel includes the steps of high-temperature annealing a blank of the armor steel to soften it, slowly cooling the annealed steel blank, overpressing the softened blank in a tool, releasing the overpressed blank from the tool upon which release, it springs to an intermediate shape that meets product shape requirements, and then heat-treating, quenching and low-temperature tempering the formed product to re-establish its hardness.

Figure 1A:
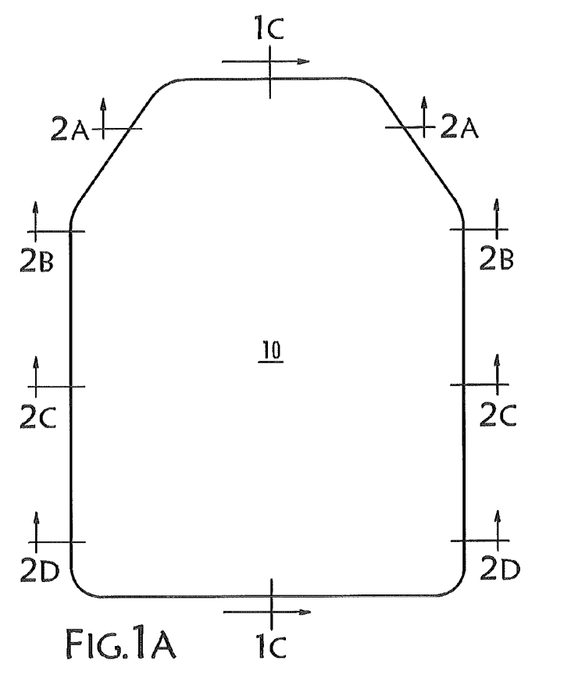
FIGS. 1A, 1B, and 1C are a front view, a top view, and a side cross-sectional view, respectively, of a torso plate for body armor, with FIG. 1C being taken along lines 1C-1C of FIG. 1A, according to an embodiment of the present invention.
Figure 1B:
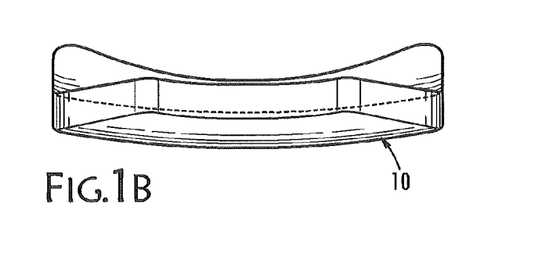
Figure 1C:
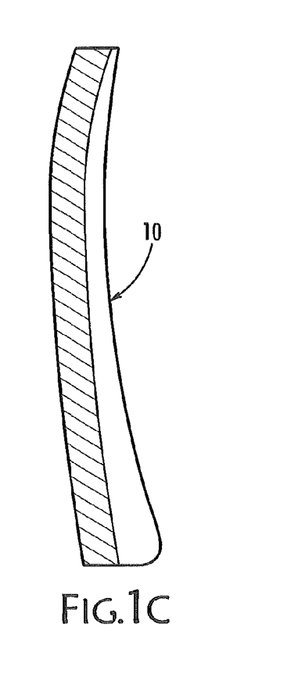
Figure 2A:
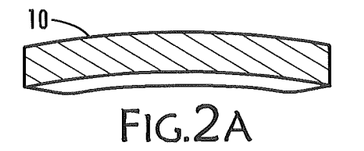
FIGS. 2A, 2B, 2C, and 2D are a series of cross-sectional views of the torso plate of FIG. 1A taken along lines 2A-2A, 2B-2B, 2C-2C, and 2D-2D, respectively.
Figure 2B:
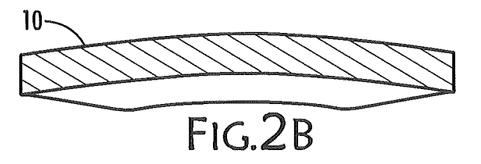
Figure 2C:
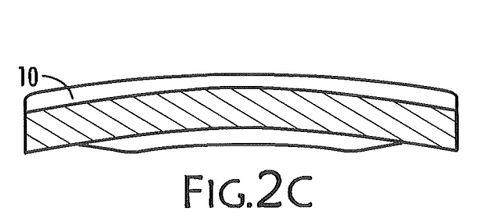
Figure 2D:
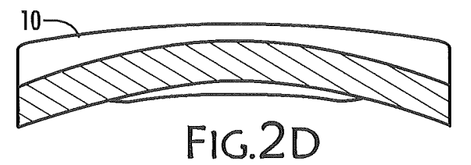

A torso plate is shown in FIGS. 1A, 1B, and 1C and generally indicated by reference number 10 curvature is known throughout the armor industry as the SAPI or ESAPI curvature. These acronyms, used by the US Army, stand for Small Arms Protective Insert and Enhanced Small Arms Protective Insert, respectively. FIG. 1A is a front view; FIG. 1B is a top view; and FIG. 1C is a side view. FIGS. 2A, 2B, 2C and 2D show sections of torso 10 to better indicate the two curves, one about a vertical axis and one about a horizontal axis, to form the compound curve of plate 10. Body armor including torso plate 10 is inserted into pockets of a simple, sewn carrier vest 14 (not shown), ready for use during a tactical event. In addition to a torso plate for wearing in the front of an individual, there may also be a back plate and two side (or kidney) plates (not shown). WO 2007/146797, filed by Edward Dovner, discloses and describes a system for attaching a ballistic plate pocket in connection with ballistic garments, and is incorporated herein by reference in its entirety.

Referring now to FIGS. 3A, 3B, 3C, and 4, armor steel is manufactured in plates that may be 2.5 m×5.0 m (8 feet×16 feet). From these large plates a much smaller blank is cut, typically with lasers or water jets. Cutting armor steel with lasers results in a heat-affected zone adjacent to the cut that creates a performance issues because that heat-affected zone is not as hard as the balance of the material. A blank is a flat, unformed, piece of armor steel in approximately the size of the finished product cut directly from a large metal plate.

The blank is then high-temperature annealed to soften it. Annealing reduces the hardness of armor steel, which is armor steel's primary advantage but is also one of its disadvantages in manufacturing. The blank is annealed at a temperature just above its austenitizing temperature, such as about 30 degrees C. (about 50 degrees F.) above the austenitizing temperature. For an armor steel such as ARMOX ADVANCE, mentioned above, the annealing temperature according to the present invention is about 870 degrees C. (about 1600 degrees F.). The austenitizing temperature of a metal is the temperature at which the metal forms austenite and varies from steel alloy to steel alloy. Because the blank is annealed, the issue of the heat affect zone caused by laser cutting is negated, which removes this otherwise significant disadvantage of laser cutting leaving the advantages of laser cutting specifically its speed.

The heated blank is then allowed to slowly cool to ambient temperature. The cooling may take place in an oven so that the temperature of the annealed blank is brought down from the annealing temperature to ambient temperature with an essentially flat temperature profile across the blank, that is, so the temperature inside the blank, except at the very edges, is essentially the same throughout the blank, plus or minus a degree Centigrade.

Figure 3A:
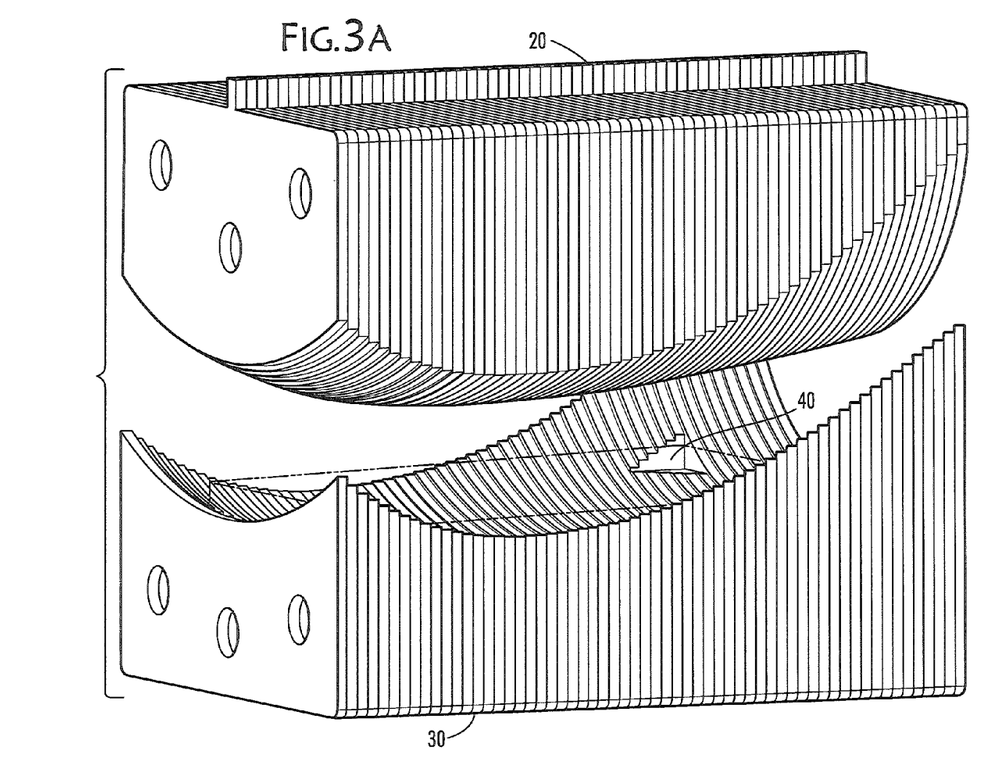
FIGS. 3A, 3B and 3C illustrate a mold for making a torso plate according to FIGS. 1A, 1B and 1C with FIG. 3A being a perspective view of the mold, FIG. 3B being a top view of the lower half of the mold of FIG. 3A, and FIG. 3C being a side cross-sectional view of the lower half of the mold shown in FIG. 3B taken along lines 3C-3C.
Figure 3B:
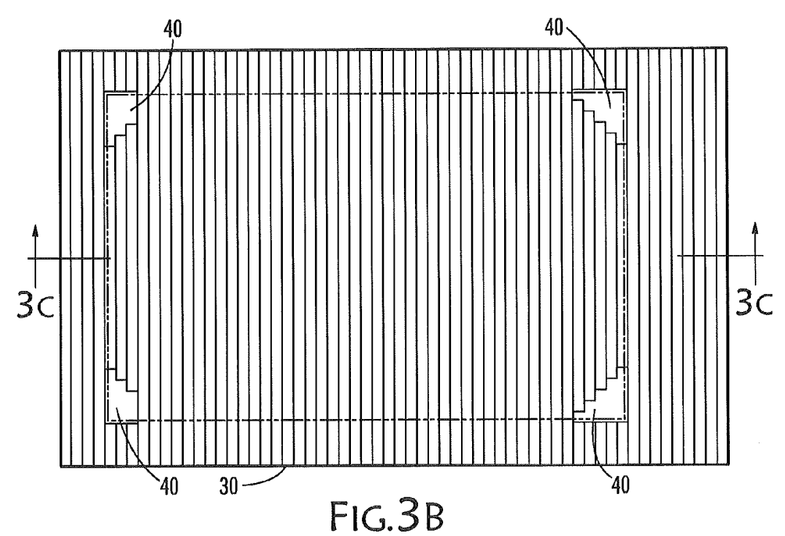
Figure 3C:
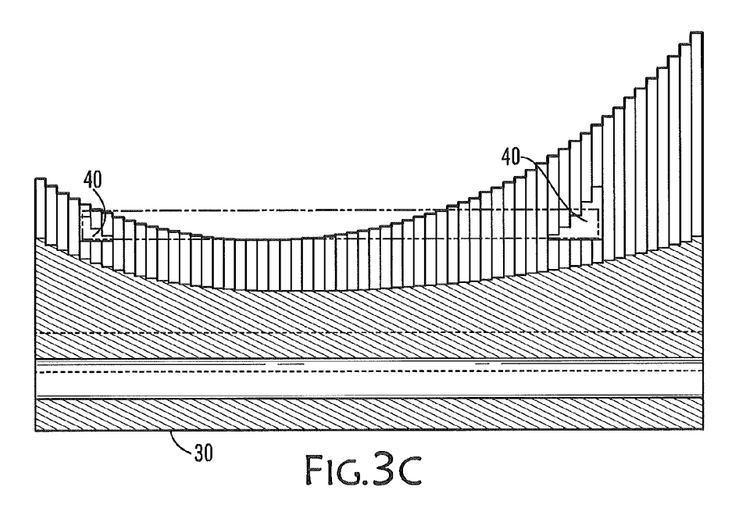
Figure 4:
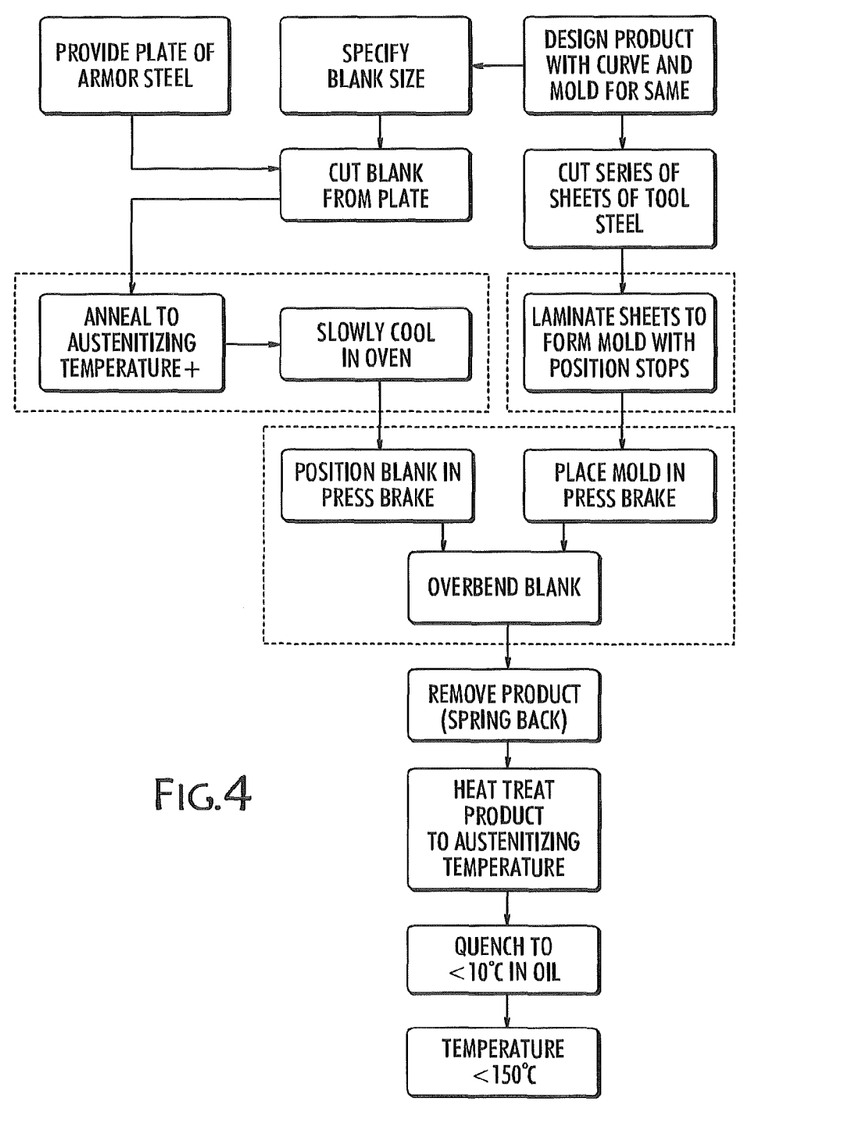
FIG. 4 is a process flow diagram according to an embodiment of the present invention.

To create the compound curvature of the annealed torso plates, matched metal tools (or molds or dies) are used. Such tools are shown in FIGS. 3A, 3B, and 3C and indicated generally by reference numbers 20 and 30, which are usually machined from solid blocks of tool-grade steel. The cost of using matched metal tools for hard steel forming is usually prohibitive because of the high degree of wear the tools experience. For armor steel, however, the wear would expect to be even greater. Annealing the blanks reduces the wear from what it would otherwise be and also reduces the impact of spring back on release of the pressed blank from tools 20, 30. In the present invention, however, tools 20, 30 may be made of thin sheets, as shown—such as less than about 1 cm (¼ inch) of reasonably-priced flat tool steel that are laminated or secured together at a cost of ¼$^{th}$ to ⅙$^{th}$ that of a block mold of solid tool steel. A view of the laminated tool is shown in FIG. 3A. Cutting a large number of sheets of tool steel and then laminating them together, which means arranging the layers to approximate the shape of a whole mold and then securing them together, in sufficiently effective and certainly lower in cost than machining the mold from a solid block of tool steel.

In the present process, shape of the product to be made, such as torso plate 10, is first established and then the shape of the corresponding tools 20, 30, is calculated based on the shape of the product.

Tools 20, 30, for use on steel in a press brake or platen press, must over-bend the blank. To over bend the blank means that the blank must be bent by tools 20, 30, into a first configuration that has a smaller radius in each direction than that of the product on release from tools 20, 30, in each of the multiple curved directions for a compound curve. When the over-bent product is released from the press brake, and it springs back to a second configuration partway between the first configuration it had when deformed by the press and its initial, flat configuration as a blank. The second configuration should approximate the specified shape of the finished product. Minor experimentation may be needed to obtain the first configuration that will result in the closest fit of second configuration to the product specification. For armor steel such as that sold by SSAB Technology AB under the trademark ARMOX ADVANCE, over-bending an annealed blank by using radii for tools 20, 30, that are approximately 60% of the finished product radii will produce a body armor torso plate 10 having the desired curvature.

If armor steel is bent without annealing, the radii for tools required for different sizes of torso body armor are different, necessitating multiple tools to produce the identical curvature depending on the size of the product to be made. Significantly, this requirement does not apply to high temperature annealed armor steel. One set of tools 20, 30, can be used for various sized blanks and the formed products will all have the desired curvature. This is a significant feature of the present invention.

A further enhancement of the laminated molding includes adding locating stops 40 on the surface of at least one of tools 20, 30 to properly position the flat blanks prior to pressing. These locating stops 40 also prevent movement of the blank within tools 20, 30, once the forming begins. Stops 40 can be added to the surface of the tools 20, 30, if made thinner than the blank or may be cut into the tool or cut into the designated sheets of the laminated tool as shown in FIGS. 3A, 3B, and 3C. Locating stops 40 are a surface feature of tool 20, 30, which enable it to act like a jig, that is, they facilitate correct positioning of the blank on the surface of tools 20, 30, and securely hold the blank during pressing. Locating stops 40 may be triangular depressions off the center of tools 20, 30, shaped to receive the corners of the blank.

The annealed blank is then positioned in said tools 20, 30, and held in position by positioning stops 40 where it is pressed in order to shape the blank into a product having a first configuration. As stated above, the press brake over-bends the blank to the first configuration but the blank springs to the second configuration immediately upon release from the press.

Following product formation, the formed product is heat treated to harden it. The product may be heated to its austenitizing temperature and then immediately quenched in oil. Tempering follows the quenching to re-harden the armor steel product compared to the annealed blank and, surprisingly, may more than restore the initial ballistic performance of the blank prior to annealing. Tempering is done at a relatively low temperature for tempering to achieve the hardness required for the particular purpose and for the particular alloy. For ARMOX ADVANCE, for example, a tempering temperature in the range of 150 degrees C. (about 300 degrees F.) is suitable. The reheat treatment process also restores hardness to any heat-affect zone of the product caused by laser cutting the blank from the larger steel place. The heat treatment temperature and tempering temperature limit are features of the present invention.

Without wishing to be bound by theory, it is believed that the tempering of the relatively smaller blank, which, in the case of a body armor torso plate may be 35 cm×28 cm (14 inches×11 inches) compared to the 2.5 m×5.0 m plate can be more reduced in temperature more quickly and uniformly. An examination of the grain structure of the as-received armor steel and the grain structure of the same blank steel processed according to the present method show the smaller plate to have a clearer grain structure suggestive of a superior armor steel Armor products other than torso plate 10 may conveniently be made according to the present method. Currently armor steels are cut and welded or bent to desired configurations but not pressed. The present method allows reduction of material for certain shapes of products because the product will conform more closely to the ideal shape for such a product. It also avoids welds which can be weak points in the armor.

Those skilled in metal forming, particularly steel forming, will understand that many modification and substitutions can be made in the foregoing embodiments without departing from the spirit and scope of the present invention, which is defined by the appended claims.

What is claimed is:

1. A process for forming armor steel into a product, said process comprising the steps of:
   (a) providing a metal plate of armor steel;
   (b) cutting a blank from said metal plate;
   (c) annealing said blank at a temperature above the austenitizing temperature of said armor steel;
   (d) cooling said annealed blank to ambient temperature
   (e) providing a tool having a first configuration, said first configuration having a compound curve;
   (f) positioning said annealed blank in said tool;
   (g) pressing said annealed blank against said tool in order to shape said annealed blank, when released from said annealed blank, into a product having a second configuration having a finished part compound curve;
   (h) heating said product to the austenitizing temperature;
   (i) quenching said heated product; and
   (j) tempering said quenched product.

2. The process of claim 1, wherein said annealing temperature is about 30 degrees C. above said austenitizing temperature.

3. The process of claim 1, wherein said blank is cooled in said cooling step from said austenitizing temperature at a rate slower than cooling in ambient temperature air.

4. The process of claim 1, wherein said blank is cooled in an oven so that a temperature profile across said blank is flat during cooling.

5. The process of claim 1, wherein said tool carries locating stops and wherein said positioning step further comprises placing said blank against said locating stops.

6. The process of claim 1, wherein said tool pressing step further comprises the step of:
   (a) pressing said annealed blank against said tool until said annealed blank has a compound curve approximately 60% of the finished part compound curve so that said annealed blank, before release from said tool, conforms to said first configuration.

7. The process of claim 1, further comprising the steps of:
   (a) cutting a series of steel plates, each plate in said series of plates representing a section of said tool, said series of plate defining said tool;

(b) securing said each plate of said series of steel plates together to form said tool.

8. The process of claim 7, further comprising the step of adding locating stops to said tool.

9. The process of claim 7, wherein said each plate is less than 1 cm thick.

10. The process of claim 1, wherein said blank providing step further comprises the step of laser-cutting said blank from a plate of armor steel.

11. The process of claim 1, wherein said tempering step is limited to less than 150 degrees C.

12. The process of claim 1, further comprising the step of powder-coating said product.

13. The process of claim 12, wherein said powder-coating step is applied at a temperature less than 130 degrees C.

14. A process for forming a blank made of armor steel into a product, said process comprising:
   (a) cutting a blank of armor steel from a steel plate with a laser;
   (b) annealing said blank at a temperature above the austenitizing temperature for said armor steel;
   (c) cooling said annealed blank so that the temperature profile of said annealed blank remains flat during cooling;
   (d) providing a tool having a first configuration;
   (e) positioning said annealed blank in said tool;
   (f) pressing said annealed blank in said tool in order to shape said blank into a product having a second configuration;
   (g) heating said product to the austenitizing temperature;
   (h) quenching said heated product; and
   (i) tempering said product.

15. The process of claim 14, wherein said temperature at which said blank is annealed is 30 degrees C. above said austenitizing temperature.

16. The process of claim 14, further comprising the step of powder coating said product at a temperature less than 130 degrees C.

17. The process of claim 14, wherein said tool carries locating stops and wherein said locating step further comprises the step of placing said blank against said locating stops before said pressing step.

18. The process of claim 14, wherein said tool providing step further comprises the steps of:
   (a) determining said first configuration for said tool that produces said product having said second configuration by reducing said second configuration by approximately 60%; and
   (b) forming said tool to have said first configuration.

19. The process of claim 14, wherein said tool providing step further comprises the steps of:
   (a) cutting a series of steel plates, each plate of said series of plates providing an incremental segment of said tool; and
   (b) securing said each plate in said series of plates together to form said tool.

20. The process of claim 19, wherein said each plate is less than 1 cm thick.

21. The process of claim 1, wherein said tool has a compound curve.

22. The process of claim 1, wherein said tool has depressions formed therein to define locating stops for said blank.

23. The process of claim 1, wherein said cooling step is performed so that the temperature profile of said blank does not vary more than ±1 C.° about a constant temperature as said blank cools.

* * * * *